United States Patent Office 3,446,732
Patented May 27, 1969

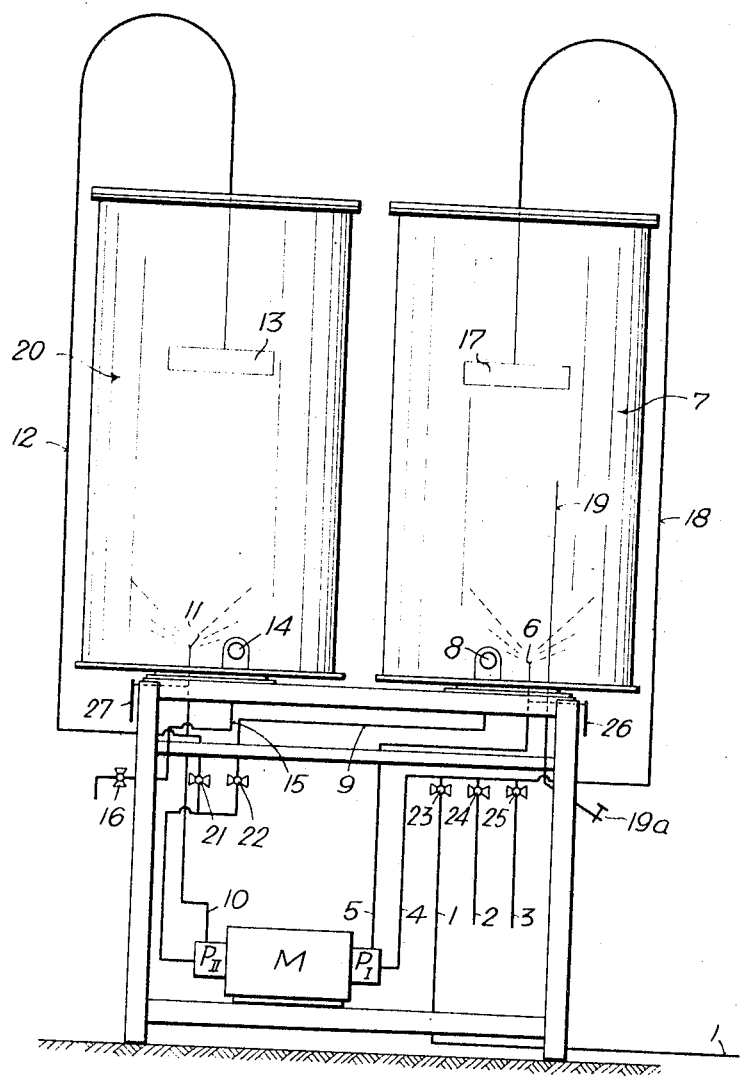

3,446,732
METHOD OF PURIFYING WASTE WATER
Adolf Gasser, Triesen, Liechtenstein, and Georg Ronge, Munich, Germany, assignors to Entwicklungs- und Forschungs-Anstalt, Schaan, Liechtenstein
Filed Dec. 5, 1966, Ser. No. 599,299
Claims priority, application Austria, Dec. 21, 1965, A 11,496/65
Int. Cl. C02b 1/18, 3/06
U.S. Cl. 210—44                                18 Claims This invention generally relates to the removal of contaminants from liquids and is particularly directed to a method of purifying waste water contaminated by emulsified oil droplets, to wit, waste water which may be considered as a stable oil-in-water emulsion.

The detrimental effect caused by oil contaminating waste water has been ignored and neglected in the past. Only more recently has it been realized and acknowledged that oil contaminated waste water, which is discharged into rivers, lakes and the like water bodies, causes serious injury to the marine and aquatic fauna and flora. Relatively small amounts of oil contained in waste water, which previously were considered as insignificant and harmless and therefore were discharged into water bodies without restrictions, have proved to be most potent poisons in causing tremendous damages to the fish and vegetation in rivers and the like water bodies. The primary reason for this is that the oil destroys the bacteria and the like micro-organisms which are necessary for the biological purification of water and thus the natural regeneration of water contaminated with organic materials is prevented. This, in turn, causes poisoning of the water bodies by feces and the like material—which normally, in the presence of bacteria, decomposes relatively rapidly, to an extent so that all marine and aquatic fauna and flora life in the respective body of water is destroyed.

In spite of the recent knowledge gained in respect to the detrimental effect of even small amounts of oil discharged into rivers or lakes, in most instances oil-containing waste water, prior to being discharged into the water body, is merely superficially purified in an oil separator in which merely the free oil floating on the surface of the waste water, is removed while appreciable amounts of oil present in emulsified form are discharged together with the water. Waste water containing emulsified oil is obtained in large quantities from industrial plants of different kinds, particularly metal working plants. The reason that the waste water is discharged without prior efficient, substantially quantitative, removal of the oil is that no economical procedure has hitherto been known for processing such waste water with a view to quantitatively removing oil and because in many instances it is not even possible to prove the presence of damaging and detrimental oil in a simple manner. Thus, even qualitative analysis of waste water to detect the presence of oil is a difficult task, a quantitative analysis requiring several hours of work. For this reason, the danger of the oil contaminants is oftentimes not properly recognized, and in many instances effective purification of the respective waste water is neglected or considered superfluous for convenience's sake. It is only after the damage has occurred and investigations are conducted to find the cause of the damage that it is usually found that oil that contaminates the waste water is the culprit to blame.

In many communities, ordinances and regulations are in force in respect to the discharge of oil-contaminated waste water. Thus, for example, in Germany, waste water can only lawfully be discharged into public water bodies if the oil content in emulsified form does not exceed 10 mg. of oil per liter. While this may be relatively small amount of oil, the fact is that even these small amounts are capable of causing tremendous damage, particularly, of course, if the waste water volumes to be discharged are large.

The prior art processing methods for superficially purifying oil-containing waste water, however, are inefficient and normally it is not possible with these prior art procedures to lower the oil content to a value below 300 to 500 mg. of oil in emulsified form per liter of water. In order to negate the detrimental effect of the oil, the waste water to be discharged is therefore oftentimes diluted to 30 to 50 times its original volume prior to the discharge of the waste water into the respective water body. This, of course, is a most disadvantageous, cumbersome and expensive procedure because it requires clean water for dilution purposes. In localities with a scarcity of water, this procedure is of course not feasible. Furthermore, the effect is in fact illusory, because the dilution of the waste water does of course not remove the oil but absolute amount of oil to be discharged remains the same. In effect, therefore, the danger that the oil destroys micro-organisms which, in turn, are necessary for the biological decomposition is not eliminated and contaminated of ground water takes place even if dilution of the waste water has been effected.

The separation of oil from waste water with the oil being present in an amount of 300 to 500 mg. in emulsified form per liter of waste water, is one of the most difficult problems of water purification technique. This is so because emulsified oil passes even through the finest filters. According to a recently proposed procedure, it has been suggested to reduce the oil content in waste water to a value of about 20 mg. of oil in emulsified form per liter. This procedure, however, requires heating of the waste water and necessitates complicated apparatus and considerable investment. For this reason, the prior art procedure referred to is not economically feasible. The need for an economical waste water purification procedure which permits effective removal of contaminating oil is therefore great.

It has been suggested that oil which is present in the waste water in the form of finely distributed droplets is caused to separate from the water by the addition of metal hydroxides to the system. According to this proposal, the oil content in the waste water can be reduced to a value of about 15 mg. of oil in emulsified form per liter. According to the procedure referred to, metal hydroxide in the form of a homogeneous preprepared paste-like mixture with extraneous oil and a stabilizing agent is added to the waste water. The system consisting of the waste water and the paste is then vigorously agitated whereupon it is allowed to stand until a portion of the oil droplets together with the metal hydroxide rise to the surface, the relatively oil-free subjacent water column is then separated from the top contaminant layer by discharging the water column in a downward direction.

However, it has been found that stable oil emulsions containing emulsifiers cannot fully satisfactorily be processed in the indicated manner because such stable oil emulsions do not break sufficiently rapidly and effectively by the mere addition of the metal hydroxide in admixture with extraneous oil. In order to break oil-in-water emulsions, it has rather been found to be necessary to modify the proposal referred to be first adding to the oil emulsion an electrolyte which favors both the coagulation of the oil droplets and at the same time supplies the metal hydroxide which is necessary for the adsorption of the oil. Further, it has been found that the metal hydroxide, which has to be present in flocculent form should be produced in situ with the oil emulsion-containing system so that the flocculent metal hydroxide thus formed acts in nascent state. This may be accomplished by precipitating a trivalent iron salt capable of forming iron hydroxide in an alkaline medium. Therefore, if the waste water is of alkaline pH and a trivalent ferrisalt is added thereto, iron hydroxide precipitates and acts in nascent state. The flocculent iron hydroxide then adsorbs the oil droplets and by adding at the same time additional, extraneous oil to the waste water system in the form of fine droplets, effective separation of the oil in the system is accomplished. By first effectively distributing the metal hydroxide and the additional oil through the system, which is accomplished by agitation, and then letting the system stand, the metal hydroxide and the oil rise to the surface from which they can be easily separated as a top layer. In this manner, a subjacent water column is obtained which is largely free from oil. However, it still contains minor amounts of extremely fine oil droplets which, according to a further feature of the invention, are subsequently separated in a second stage by adding a purifying material of particular composition and nature. Generally, the separation of the residual oil in the second stage may be accomplished by means of a purifying material according to the recent proposal previously referred to. However, advantageously in accordance with a further feature of the invention mixing of the partially purified water column with the purifying medium is accomplished in a certain quantity ratio. This is best accomplished by injecting a mixture of the partially purified water column with the purifying medium through a nozzle into a container in which the final separation takes place. It has been established that in this manner not only is there obtained an increase in the separation effect, but the process can be performed in a more economical manner.

Accordingly, it is a primary object of the present invention to overcome the disadvantages and drawbacks of the prior art oil purifying procedures and to provide a procedure by means of which waste water in the form of oil-in-water emulsions can be effectively purified to substantially quantitatively remove the oil in a simple and inexpensive manner. The inventive procedure may be performed at ordinary temperatures and may be carried out in any suitable apparatus in which mixing and separation can be accomplished. However, it is particularly advantageous to use an apparatus which essentially comprises two adjacently arranged separating vessels.

Briefly, therefore, the invention essentially resides in a two-stage method for purifying waste water contaminated by emulsified oil droplets, to wit, waste water constituting a stable oil-in-water emulsion. According to the first stage of the inventive method, the waste water is mixed at an alkaline pH value with extraneous oil and a solution of a ferric salt capable of forming iron hydroxide in an alkaline medium. The ferric salt may be, for example, ferric sulfate, ferric chloride or the like. Due to the alkalinity of the waste water, the ferric salt precipitates in the form of a flocculent iron hydroxide and the iron hydroxide therefore acts in nascent state. The system is then allowed to stand, whereby the iron hydroxide, together with the contaminating oil droplets and the added oil, rise to the surface to form a top layer while the purified water forms a subjacent water column. This water column, however, is not entirely devoid of oil, and therefore in the second stage the water column is mixed with a purifying material which comprises iron hydroxide, oil and a stabilizing agent. This mixture is then allowed to stand, whereby the remaining contaminating oil and the purifying material rise to the surface to form a surface layer, the pure water being in the form of a subjacent column below this layer. This pure water may then be discharged into the respective water body, be it a river or lake.

The waste water is originally imparted with an alkaline pH value by mixing it with any suitable alkaline substance.

Preferably, the waste water is mixed with the oil and the ferric salt solution by injecting the waste water, the oil and the ferric salt solution through a nozzle or the like into a reaction vessel which preferably has a greater height than width. It is advantageous to perform separate injection of the waste water, the oil and the ferric salt solution.

A particularly advantageous pH value is about between 11 and 11.5.

Concerning the ferric salt solution, it has been found that excellent results are obtained with ferric sulfate solutions of about 5% concentration.

Concerning the quantity ratio of purifying medium to be added to the partially purified water column in the second step, it has been established that the volume ratio of water column to purifying material should be about between 1:1 to 13:1.

In respect to the purifying medium which, as previously stated, contains a stabilizing agent, it has been established that magnesium oxide is an excellent stabilizer for the indicated purpose. The iron hydroxide contained in the purifying material is obtained by suspending anhydrous ferric salt, for example, ferric sulfate, powder, in water and before the ferric salt has been completely dissolved in the water, an amount of sodium hydroxide solution is rapidly added to the suspension under stirring until the pH value of the suspension is about 8.5. In this manner flocculent iron hydroxide precipitates which is then mixed with the oil and the stabilizing agent into a paste. The sodium hydroxide solution used for precipitating the ferric salt should preferably be in the form of an aqueous solution of about 2.5 N concentration.

As previously stated, the purifying material should preferably be in the form of paste. This paste can be formed by homogenizing, for example, about 0.3 to 3% by weight of iron hydroxide, about 30 to 99% by weight of oil, and about 0.1 to 1% by weight of magnesium oxide, with the remainder being water and the iron hydroxide having been obtained in the manner described above. The surface layer obtained in the second stage and thus consisting essentially of oil, iron hydroxide and stabilizer may be re-used for initially purifyng a fresh amount of waste water.

The various features of novelty which characterize the invention are pointed out with particularlity in the claims annexed to and forming a part of this specification. For a better understanding of the invention, its operating advantages and specific objects attained by its use, reference should be had to the accompanying drawings and descriptive matter is which there is illustrated and described a preferred embodiment of the invention.

The single figure of the drawing is a preferred embodiment of a separating plant for carrying out the inventive two-step purifying procedure.

Referring now to the drawing, the plant comprises two separating vessels 7 and 20, advantageously of equal volume. The vessels have preferably cylindrical cross section and have a height which is greater than their diameter. The two vessels 7 and 20 are connected with each other by means of a conduit or pipeline 9, a valve 22, a motor pump PII and pipeline 10. The line 10 projects into the interior of the vessel 20 and is there fitted with an injection nozzle 11. A similar injection nozzle 6 is located adjacent the bottom of vessel 7, nozzle 6 being connected with pump PI via line 5. The ingredients to be injected into the vessel 7 are sucked through branch lines 1, 2 and 3 and combined in the collecting line 4. The pump PI then forces the mixture from line 4 into line 5 and injects it through the nozzle 6 into the interior of the vessel 7. The branch lines 1, 2 and 3 are fitted with control valves 23, 24 and 25 so that the throughput through the branch lines can be adjusted at will and the quantity ratio of the components or ingredients to be conveyed can thus be chosen in any desired manner. A suction disk or plate 17 is arranged within vessel 7, while a corresponding disk 13 is present in the vessel 20. These disks are adjustable as to their height position within the respective vessels and are connected with the suction part of the pump associated with the respective vessel by means of a line 18 and 12, respectively, which pass through the cover of the respective vessel. In respect to vessel 20, the pipeline 12 merges via a control valve valve 21 with the line 9, to wit the line which connects the two vessels 7 and 20 with each other. A desired mixing ratio can easily be obtained in line 9 by suitably setting the control valves 21 and 22. The liquid content can be discharged from vessel 20 through line 15 and discharge cock 16, ball valve 14 being provided at the upper end of line 15. A similar arrangement may be provided at the vessel 7 where the discharge cock 19a is in communication with the line 19. In this case, however, the ball valve 8 is situated at the outlet of the previously mentioned connecting line 9. The spraying characterisitcs of the nozzles 6 and 11 can be adjusted within certain limits by means of control levers 26 and 27, respectively.

The inventive procedure can be carried out in the aparatus hereinabove described as follows: Oil-containing waste water is supplied through line 1 while iron salt solution, for example, an iron sulfate solution of 5% concentration, is supplied through line 2. Oil, in turn, is introduced into line 3. The pump PI pumps these three components through line 4 in a ratio determined by the setting of the control valves 23, 24, 25 and the mixture thus obtained flows through pressure line 5 through the nozzle 6 which sprays the mixture into the vessel 7. The mixture of ingredients is supplied to the vessel 7 until the vessel is filled, whereupon the pump is switched off. Phase separation takes place after some time, to wit, a top layer of contaminants and a subjecent partially purified water column are formed. When the volume of the top layer constitutes but one fifth of the total volume of the vessel, pump PII is switched on and the subjacent water column is conveyed through line 9 and the valve 22 to the suction portion of the pump PII whereupon, through pressure line 10, the mixture reaches the nozzle 11 which injects the mixture into the vessel 20. Purifying medium in the form of a paste has previously been supplied to vessel 20. The suction disk 13 is at that time in its lowermost position adjacent the bottom of the vessel 20. Through the suction disk 13, the line 12 and the valve 21, the suspension formed in the vessel and which thus consists of purifying medium, oil and water, is circulated and mixed with the incoming water entering from vessel 7. The quantity ratio between entering water and purifying medium is regulated by suitably setting the valves 21 and 22. A suitable ratio between purifying medium and water is 1:1 to 1:13. When the procedure is first initiated the purifying medium may be supplied in the form of a paste consisting of 0.3 to 3% by weight of iron hydroxide, 30 to 99% by weight of oil, 0.1 to 1% by weight of magnesium oxide, the rest being water, the pH value of the paste being about 8.5. By means of the action of the suction disk 13, intimate mixing of the water and the purifying medium in the vessel 20 takes place. It is thus not necessary to fit the vessel 20 with any rotating mixer of the like. After the entire amount of water column from vessel 7 has been introduced into vessel 20, valve 22 is closed. The suction and mixing action exerted by the suction disk 13, the line 12 and the valve 21 should be continued until the paste is uniformly distributed throughout the water in the vessel 20 so as to obtain a homogeneous mixture. Thereafter, the pump PII is switched off and the mixture in the vessel 20 is allowed to stand until phase separation sets in. After about 3 to 4 hours, optimum separation conditions usually have been obtained and the clear subjacent liquid column is discharged, for which purpose cock 16 of line 15 is opened.

Of course, during the period in which the water is processed in vessel 20 and after valve 22 has been closed, a new batch of oil-contaminated waste water may be injected into vessel 7. However, before doing so it is advantageous to remove at least the major portion of the material constituting the top layer in vessel 7, to wit the oil and iron hydroxide mixture which is left in the vessel when the water from vessel 7 is conveyed to vessel 20. For this purpose, a collecting vessel (not shown) may be provided which has a porous bottom plate so that any residual water contained in the top layer descends through the pores and settles in the bottom of the collecting vessel below the porous plate with the relatively solid residue of oil and iron hydroxide depositing on the porous plate surface. This surface is combustible and can thus be easily burned.

Before the waste water is introduced into the vessel 7, it is preferably first collected in a receptacle in which it is made alkaline with a suitable alkaline substance such as sodium hydroxide solution. Due to the alkalinity of the waste water, the iron salt solution which is injected with the waste water into vessel 7 will then precipitate to form the desired iron hydroxide in nascent state. The most favorable pH range value for this purpose is between about 11 to 11.5. This relatively high alkalinity is necessary because ferrisalt solutions, such as ferrisulfate solutions, react strongly on the acidic side due to hydrolysis, and when the iron salt solution is mixed with the waste water, the acid ferrisalt solution thus significantly lowers the pH value of the mixture obtained. Since, however, for precipitation of iron hydroxide a pH value of 6.5 to 7.5 must prevail, the original alkalinity of the waste water before the iron salt solution is added must be appreciably higher.

The flocculent precipitate which is formed by the iron salt and which has been referred to herein as hydroxide, most probably does not consist exclusively of hydroxide proper, but the flakes or floccules also contain a more or less large water content which is probably bound to the hydroxide or the basic salts formed in this manner. Essential for the inventive procedure is merely that the iron hydroxide used in the first step of the procedure is precipitated in situ, to wit, in the waste water proper, so that it acts in nascent state and comes into direct contact with the oil droplets present in the system. In this connection, it should be appreciated that during the precipitation of iron hydroxide, first microscopically small amorphous primary particles are formed which have a very large surface and whose capability to adsorb $H_2O$, $H^+$ or $OH^-$ ions or other ions determines to a far reaching extent the characteristics and properties of the precipitate. In accordance with the invention, it was found that not only ions are subject to this adsorption effect, but also the extremely fine oil droplets which are emulsified in the water and which normally have an electric charge. Therefore, oil emulsions containing emulsifiers or stabilizers are also effectively processed by the inventive procedure.

Consequently, it is not surprising that the iron hydroxide which is used in the second stage of the procedure as adsorption component of the purifying material should have similar characteristics as the iron hydroxide of the first stage and that this second stage iron hydroxide should be produced in a particular manner in order to render it effective as adsorbent for repeated use. As a matter of fact, it has been ascertained that the effectiveness of the procedure is very much dependent on the nature of the hydroxide, which should be prepared according to a particular procedure so as to render the hydroxide usable for repeated use. Accordingly, it is an important feature of the invention that the iron hydroxide used in the purifying medium of the second stage is prepared from a fine powderous, substantially completely dehydrated iron salt, for example ferrisulfate, and that this iron salt is slurried with water for a brief period only and that the slurry or suspension is admixed with an alkaline material, as for example sodium hydroxide solution of 2.5 N concentration, in such an amount that the pH value of the suspension or slurry is about 8.5. In this manner, flocculent iron hydroxide precipitates.

It is also important that the addition of the alkaline solution to wit, for example, the sodium hydroxide solution, is effected at a stage at which the major portion of the suspended iron salt powder is still in undissolved state. Applicants do not wish to be limited to any theories, but it is assumed that in this manner a precipitate is obtained which still contains ferrisalt, to wit, for example, ferrisulfate, which exerts a certain depot action and constitutes a so-called clathrate of which the core is enveloped by a hydroxy layer, which is not further changed, and the core thus cannot be further attacked by water. Upon contact of the material thus obtained with the waste water to be purified, for example the waste water to be introduced into vessel 20, it is assumed that a portion of the hydroxide envelope is destroyed. This may possibly be the result of mechanical forces which occur during agitation or by forces which become active during the adsorption procedure, so that a fresh amount of liquid contacts unconsumed iron salts and dissolves it whereby, however, immediately iron hydroxide is formed again due to the presence of the OH ions which are present in the system in excess. This iron hydroxide again is active in nascent state and, due to its particularly active surface, exerts the adsorption effect previously referred to. The depot action therefore probably must be attributed to the enveloped iron salt moiety. The magnesium oxide or the like stabilizer which is present in the purifying material paste has a tendency to favor this effect since it maintains the slightly alkaline reaction of the purifying medium.

If ferrihydroxide is used for the preparation of the purifying medium which has been precipitated from a completely dissolved ferrisalt solution by the addition of alkali, then such purifying medium exerts a significantly lower purifying effect. If such iron hydroxide is re-used, the adsorption effect is so low that insufficient oil separation takes place. Therefore, iron hydroxides which have been precipitated from completely dissolved iron salt cannot normally be re-used but have to be discarded after a single use.

In addition to magnesium oxide, other additives may be employed in order to increase the activity of the purifying medium. Such additives are, for example, amorphous silicic acid, active carbon (charcoal), calcium carbonate and calcium chloride. In practice, however, none of these substances has the same favorable effect as that of magnesium oxide.

It should be appreciated that the re-use of the purifying medium is, of course, limited since here is a natural consumption or exhaustion that takes place.

The invention will now be described by a specific example, it being understood, however, that this example is given by way of illustration and not by way of limitation and that many changes may be effected without affecting in any way the scope and spirit of the invention as recited in the appended claims.

Example 125 liters of oil containing waste water were first rendered alkaline by adding about 2 liters of sodium hydroxide solution of 2.5 N strength. Since the pH of the waste water to be treated should preferably be in the range of about 11 to 11.5, additional amounts of sodium hydroxide solution may be added if this is necessary to reach the desired pH value. Subsequently, 7 liters of aqueous ferrisulfate solution of 5% concentration and 2.5 liters of mineral oil were added to the alkaline waste water and mixed therewith vigorously. This may be accomplished in an apparatus as shown in the drawing, to wit, the ferrisulfate solution, the mineral oil and the waste water may be conveyed from separate storage containers to a common feed line and then injected into the vessel 7 through a nozzle 6 or the like. The partially purified water which is obtained in the vessel after phase separation has a volume of about 100 liters and a pH value of 6.8. The pH value normally fluctuates in the range of 6.5 to 7.5 after the initial purification. The pH, however, should not decrease below a value of 6.

20 liters of paste-like purifying medium were then added to the 100 liters of partially purified water. This second purification step may again be accomplished in the apparatus of the drawing, to wit, by conveying the subjacent water column from vessel 7 into the vessel 20 and by vigorously mixing the water in vessel 20 with the appropriate amount of purifying paste. The purified water obtained in vessel 20 had a pH value of about 7.5 to 8.0. This means, of course, that the purifying paste is being deprived of part of its alkalinity during the second purification step. If the purifying medium which is recovered after the purified water has been discharged from vessel 20 is to be re-used for purifying an additional amount of 100 liters of partially purified water emanating from vessel 7, then the pH value of the purified water will be reduced to about 7.7. After the purifying medium has thus been re-used six times, the resulting purified water will have about the same pH value as the partially purified water obtained in vessel 7. The oil content of the purified water discharged from vessel 20 was then 11 to 13 mg. per liter.

The speed with which the oil charged flocculent iron hydroxide rises to and collects at the surface of the water and the clear phase separation sets in, is dependent on the pH value of the water. The speed increases with a lower pH value. However, it has also been observed that when the oil-charged iron hydroxide floccules rise more rapidly to the surface, then a slight decrease of the purification effect is, in turn, obtained. When the iron hydroxide flakes rise rapidly, the purified water in vessel 20 remains somewhat opaque and the analysis of the water shows a higher oil content. However, if care is taken that the partially purified water obtained in vessel 7 is supplied to the second purification step in vessel 20 at a pH value of 6.5 to 7.5, then a lowering of the pH value in the purified water obtained in vessel 20 to the unfavorable range of pH 6 or below does not take place. Therefore, the pH value of the water emanating from vessel 7 should be suitaby adjusted, if necessary. As a general proposition, 20 liters of purifying medium are capable of purifying about 2 cubic meters of waste water. In respect to larger plants, it is recommended that the purified water emanating from vessel 20 is collected in a reservoir or the like prior to discharge into the respective water body in order to buffer the first runs, whose pH value sometimes is above 8. Of course, it may be preferred in some instances to lower the pH value and to neutralize the purified water by the addition of acid. Since the buffer capacity of the water in this range is very small, only very small acid amounts are necessary for that purpose.

While a specific embodiment of the invention has been shown and described in detail to illustrate the application of the inventive principles, it will be understood that the invention may be embodied otherwise without departing from such principles.

What is claimed is:

1. A method of purifying waste water contaminated by emulsified oil droplets, which comprises:
    (1) mixing the waste water at an alkaline pH value with oil and a solution of a ferric salt capable of forming iron hydroxide in an alkaline medium, whereby flocculent iron hydroxide is formed in nascent state,
    (2) allowing the mixture to stand, whereby the iron hydroxide, together with contaminating oil droplets and the added oil, rises to the surface to form a top layer,
    (3) separating the top layer from the subjacent water column,
    (4) subsequently mixing the subjacent water column with a purifying material comprising iron hydroxide, oil and a stabilizing agent, (5) allowing the mixture to stand, whereby remaining contaminating oil and the purifying material rise to the surface to form a surface layer, and
(6) separating the surface layer from the remaining pure water.

2. A method as claimed in claim 1, wherein the waste water is imparted with an alkaline pH value by mixing it with an alkaline substance.

3. A method as claimed in claim 1, wherein the pH value is about between 11 and 11.5.

4. A method as claimed in claim 1, wherein the ferric salt is ferric sulfate.

5. A method as claimed in claim 1, wherein an aqueous ferric sulfate solution of about 5 percent concentration is employed.

6. A method as claimed in claim 1, wherein the volume ratio of the water column and said purifying material is about between 1:1–13:1.

7. A method as claimed in claim 1, wherein the stabilizing agent is magnesium oxide.

8. A method as claimed in claim 1, wherein said subsequent mixing is performed in a separate vessel into which said water column and said purifying material are injected through nozzle means.

9. A method as claimed in claim 1, wherein said purifying material is in the form of a paste obtained by homogenizing about 0.3–3 percent by weight of iron hydroxide, about 30–99 percent by weight of oil and about 0.1–1 percent by weight of magnesium oxide with the remainder being water, said iron hydroxide being obtained by suspending anhydrous ferric salt powder in water and, before the ferric salt has been completely dissolved in the water, rapidly adding an amount of sodium hydroxide solution to the suspension under stirring until the pH value of the suspension is about 8.5, whereby flocculent iron hydroxide precipitates.

10. A method as claimed in claim 1, wherein said surface layer is re-used by mixing it with a fresh amount of water column.

11. A method as claimed in claim 1, wherein the mixing of the waste water with the oil and the ferric salt solution is effected by injecting the waste water, the oil and the ferric salt solution through nozzle means into a reaction vessel which has a greater height than width.

12. A method as claimed in claim 11, wherein waste water, the oil and the ferric salt solution are separately injected into the reaction vessel.

13. A method as claimed in claim 1, wherein the iron hydroxide of said purifying material is obtained by suspending anhydrous ferric salt powder in water and, before the ferric salt has been completely dissolved in the water, rapidly adding an amount of sodium hydroxide solution to the suspension under stirring until the pH value of the suspension is about 8.5, whereby flocculent iron hydroxide precipitates.

14. A method as claimed in claim 13, wherein the ferric salt is ferric sulfate.

15. A method as claimed in claim 13, wherein the sodium hydroxide solution is an aqueous solution of about 2.5 N concentration.

16. A method of purifying waste water in the form of stable oil-in-water emulsions, which comprises:
(a) injecting oil, a solution of ferric salt capable of forming iron hydroxide in an alkaline medium and the waste water at an alkaline pH value into a first vessel,
(b) allowing the mixture thus obtained to stand, whereby flocculent iron hydroxide thus formed, oil droplets and added oil rise to the surface to form a top layer,
(c) injecting the subjacent partially purified water column together with a purifying material into a second vessel, said purifying medium essentially consisting of a paste of iron hydroxide, magnesium oxide and oil,
(d) allowing the mixture of purifying material and water column thus obtained to stand in said second vessel, whereby a surface layer of purifying material and remaining oil droplets is formed, and
(e) discharging the purified water from the second vessel.

17. A method as claimed in claim 16, wherein a fresh amount of partially purified water column is introduced into the second vessel for mixture with the surface layer therein.

18. A method as claimed in claim 16, wherein said paste is obtained by homogenizing about 0.3–3 percent by weight of iron hydroxide, about 30–99 percent by weight of oil and about 0.1–1 percent by weight of magnesium oxide with the remainder being water, said iron hydroxide being obtained by suspending anhydrous ferric salt powder in water and, before the ferric salt has been completely dissolved in the water, rapidly adding an amount of sodium hydroxide solution to the suspension under stirring until the pH value of the suspension is about 8.5, whereby flocculent iron hydroxide precipitates.

References Cited

UNITED STATES PATENTS

| 2,468,188 | 4/1949 | Frankenhoff | 210—75 |
| 2,588,794 | 3/1952 | Barton | 210—21 |
| 3,347,786 | 10/1967 | Baer et al. | 210—61 X |

MICHAEL E. ROGERS, *Primary Examiner.*

U.S. Cl. X.R.

210—61, 201